US006864914B1

(12) United States Patent
Birk

(10) Patent No.: US 6,864,914 B1
(45) Date of Patent: Mar. 8, 2005

(54) APPARATUS AND A METHOD FOR MONITORING AN ANIMAL RELATED SPACE

(75) Inventor: Uzi Birk, Huddinge (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 09/581,078

(22) PCT Filed: Dec. 9, 1998

(86) PCT No.: PCT/SE98/02270

§ 371 (c)(1),
(2), (4) Date: Aug. 21, 2000

(87) PCT Pub. No.: WO99/30277

PCT Pub. Date: Jun. 17, 1999

(30) Foreign Application Priority Data

Dec. 9, 1997 (SE) .............................. 9704589

(51) Int. Cl.[7] ............................................ H04N 5/232
(52) U.S. Cl. ................... 348/211.99; 348/14.03
(58) Field of Search ................ 348/14.03, 14.09, 348/211.99, 211.4, 211.8, 211.9

(56) References Cited

U.S. PATENT DOCUMENTS

| 3,718,120 A | * | 2/1973 | Schwarz et al. | ............ 119/421 |
| 4,636,137 A | | 1/1987 | Lemelson | |
| 4,867,103 A | * | 9/1989 | Montalescot et al. | .... 119/14.08 |
| 5,677,728 A | | 10/1997 | Schoolman | |
| 5,808,551 A | * | 9/1998 | Yarnall et al. | ............ 340/573.4 |
| 5,850,340 A | * | 12/1998 | York | ............................. 700/83 |
| 5,950,562 A | * | 9/1999 | Schulte et al. | ............ 119/51.02 |
| 5,979,359 A | * | 11/1999 | Hansson | .................. 119/14.08 |
| 6,107,937 A | * | 8/2000 | Hamada | ................. 340/825.69 |

FOREIGN PATENT DOCUMENTS

| EP | 0 231 717 | 8/1987 |
| EP | 0 758 776 | 2/1997 |
| WO | WO 97/15901 | 5/1997 |

* cited by examiner

Primary Examiner—Tuan Ho
Assistant Examiner—Gevell Selby
(74) Attorney, Agent, or Firm—Young & Thompson

(57) ABSTRACT

An apparatus for monitoring at least a part of an animal related space (18) comprises a controllable device (2, 22) and at least one image capturing device (14, 15) for generating and supplying captured image data regarding said animal related space. According to the invention, the image capturing device (14, 15) is associated with a communications port (24) connectible to a telecommunications network (26), a remote control device (28) is associated with a further communications port (30) connectible to said telecommunications network (26). The image capturing device (14, 15) is connectable to said remote control device (28) via said telecommunications network (26) and the remote control device (28) is adapted to receive said captured image data. The remote control device (28) is provided with a display unit (32) for allowing viewing of said captured image data. A data input means (34) is associated with said remote control device (28), for entering a control instruction. The remote control device (28) is adapted to output said control instruction via said further communications port (30), and the controllable device (2, 22) is arranged to be interactively manipulated by said remote control device (28) in response to said control instruction.

38 Claims, 4 Drawing Sheets

APPARATUS AND A METHOD FOR MONITORING AN ANIMAL RELATED SPACE

TECHNICAL FIELD OF THE INVENTION

The present invention relates to an apparatus for monitoring at least a part of an animal related space, comprising a controllable device and at least one image capturing device for generating and supplying captured image data regarding said animal related space.

It also relates to a method therefore, and furthermore to a remote control device.

BACKGROUND OF THE INVENTION

An apparatus and a method of this kind are known from WO 97/15901, which suggests that a cow is monitored by a video camera. The video camera is connected to an image analysing means using colour analysis, by means of which it is possible to establish the position of an animal or whether an animal has a bleeding wound.

In WO 94/19931, a method and a device for surveying animal functions are disclosed. The kind of sensor to be used is not disclosed. However, the sensors are arranged i.a. in the milling system, the feeding system and the milking system, indicating that the kind of sensor to be used is e.g. a milk flow sensor or a feed amount sensor.

The sensors are connected to a plurality of discrete control systems, which in turn are connected to a central control system, which is operated by a computer terminal, presumably in a control room of the farm. In case of urgency a supervisor is called by means of a telephone paging device, and is also informed of the urgency of the call.

Accordingly, the disclosed system is solely a warning system, which means that the supervisor, or somebody else, must go to the stall and perform suitable actions. As a farmer may be out on the fields when receiving the warning signal, it may take quite a while before he or she is able to do so.

It is thus the object of the invention to provide an improved apparatus and method for monitoring an animal related space.

SUMMARY OF THE INVENTION

This has been solved by an apparatus of the initially defined kind, which is characterised in that:
- said image capturing device is associated with a communications port connectible to a telecommunications network;
- a remote control device is associated with a further communications port connectible to a telecommunications network;
- said image capturing device is connectible to said remote control device via said telecommunications network;
- said remote control device is adapted to receive said captured image data;
- said remote control device is associated with a display unit for allowing viewing of said captured image data;
- a data input means is associated with said remote control device, for entering a control instruction;
- said remote control device is adapted to output said control instruction via said further communications port;
- said controllable device is arranged to be interactively manipulated by said remote control device in response to said control instruction.

It has furthermore been solved by an apparatus of the initially defined kind, which is characterised in that said image capturing device is associated with a communications port connectible to a telecommunications network, for association of said image capturing device with a remote control device connectible to said telecommunications network and adapted to receive said captured image data.

The initially mentioned remote control device adapted to receive captured image data comprises:
- a display unit for allowing viewing of said captured image data;
- a data input means for entering a control instruction;
- a communications port, via which said control instruction is to be output, for interactively manipulating a controllable device of the apparatus.

The object has also been achieved by a method of the initially defined kind, which is characterised by:
- connecting said image capturing device to a communications port for allowing connection to a telecommunications network;
- connecting a remote control device to a further communications port for allowing connection to a telecommunications network;
- adapting said remote control device to receive said captured image data;
- providing said remote control device with a display unit;
- entering a control instruction in a data input means associated with said remote control device;
- transmitting said control instruction via said farther communications port; and,
- interactively manipulating said controllable device by said remote control device in response to said control instruction.

By the defined apparatuses and method, it is possible to remotely view the stall.

Suitably, said controllable device is associated with said communications port. Hereby, it is possible not only to view, but also to interactively perform suitable actions in the barn—e.g. via the Internet.

Preferably, a control means is provided between said controllable device and said communications port, said controllable device being automatically controlled by said control means. Hereby, it is possible to allow said control means to perform operations while remotely viewing said animal related space.

Suitably, said control means is provided between said image capturing device and said communications port, said image capturing device being automatically controllable by said control means, hereby, it is possible to remotely view the animal related space, while allowing said control means to control e.g. the sharpness of the image.

Preferably, a switch means is provided for allowing by-pass of said control means. Alternatively, said control means is switchable to a remote control mode for receiving said control instruction from said remote control device, said controllable device being adapted to perform an operation in response to said remote control device via said control means. Hereby, it is possible to choose between a local manual or automatic control and a remote manual or automatic control of the image capturing device and/or the controllable device.

Preferably, either of said remote control device and said control means is adapted to generate an alerting signal if an abnormal situation is established. Hereby, it is possible to give a warning to a person handling the remote control, or to the farmer.

Suitably, said animal related space comprises an animal space, such as an animal gateway, provided with said controllable device. Hereby, it is possible to monitor a limited area.

Preferably, said controllable device comprises an openable and closeable gate, a position of said gate is established by said image capturing device. Alternatively, said controllable device comprises a movable robot arm provided with a gripper. Hereby, it is possible to perform animal related operations, such as allowing an animal to enter, or preventing it from entering, said animal space or cleaning its teats.

Suitably said image capturing device is arranged on said robot arm. Hereby, it is possible, while moving the robot arm, not only to view an object, but also to move the image capturing device closer to the object.

Preferably, a position of a teat of an animal is established by said image capturing device, for allowing attachment of a teatcup on said teat.

Suitably, the apparatus further comprises a milking equipment provided with at least one teatcup associated with a pulsator, adapted to be controlled by said remote control device. Furthermore, said teatcup is associated with a vacuum source via a valve, said valve being adapted to be operated in response to said remote control device. Hereby, it is not only possible to remotely perform milking of an animal, but also to remotely control the milking operation.

Preferably, said controllable device comprises a driving means with a turnable axle connectible to said image capturing device. Hereby, it is possible to remotely turn the image capturing device in a desired direction.

Suitably, said controllable device comprises a driving means for a zoom lens arranged on said image capturing device. Hereby, it is possible to remotely get a closer view of an object without moving the image capturing device.

Preferably, analysis of an image captured by said image capture device is performed by said control means. Hereby, it is possible to enter a control instruction outgoing from information received from the control means. Alternatively, analysis of an image captured by said image capture device is performed by said remote control device. Hereby, it is possible to automatically manipulate said controllable device by means of said remote control.

Suitably, said remote control device is provided with a display unit for allowing viewing of said captured image data. Furthermore, a data input means is associated with said remote control device, for entering a control instruction. Additionally, said control means is provided with a display unit for allowing viewing of said captured image data A data input means is associated with said control unit for entering a control instruction. Hereby, it is possible to manually manipulate said controllable device.

Suitably, said control unit and/or remote control device is/are provided with a microphone for inputting verbal commands and said animal related space is provided with a loud speaker. Hereby it is possible for a supervisor to input verbal commands to operate the controllable device and/or to give commands or reassurance to an animal in the animal related space.

Suitably, said control unit and/or remote control device is/are provided with a loudspeaker and said animal related space is provided with a microphone. Hereby it is possible for a supervisor to listen to events taking place in the animal related space.

DRAWING SUMMARY

The invention will now be described in more detail with reference to the accompanying drawings, in which.

DETAILED DESCRIPTION

Figure 1:
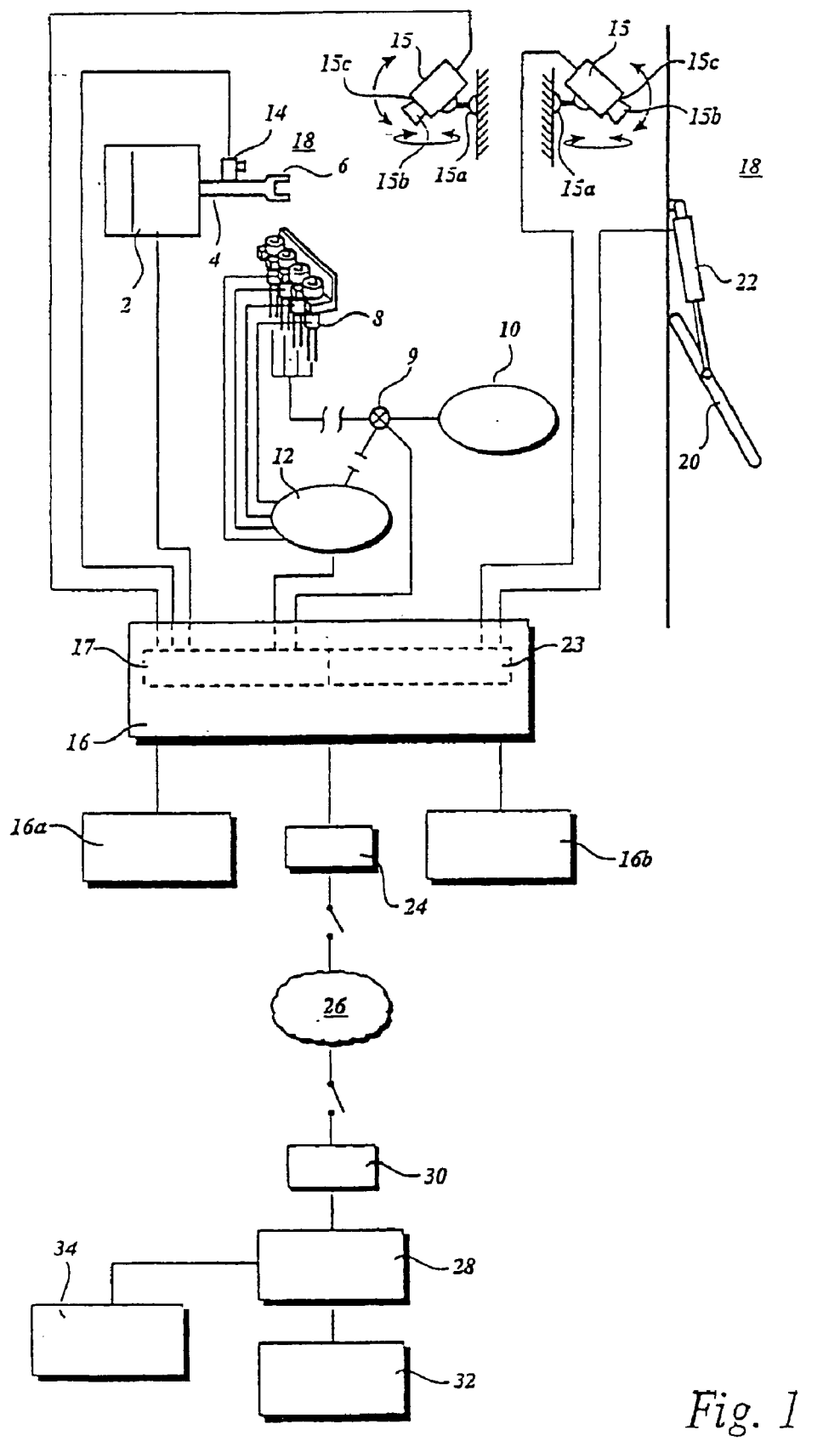
FIG. 1 illustrates schematically the apparatus according to the invention.

FIG. 1 shows an animal related robot 2 provided with a robot arm 4 and a gripper 6 intended to grip an animal related means, such as a teatcup 8 and perform an animal related operation, such as attaching the teatcup 8 onto a teat of an animal. The teatcups 8 are connected via a valve 9 to a vacuum source 10 and to a pulsator 12 for creating a milking vacuum and a pulsating vacuum.

Of course, the robot arm 4 with gripper 6 may also be used for moving other animal related devices to said animal, such as a pre-milking unit, a massage unit or a teat cleaner, for performing an appropriate animal related operation.

A robot image capturing device 14, such as a digital camera or a video camera, is arranged on the robot arm 4 for viewing e.g. an animal's udder from a relatively short distance. At least one further image capturing device 15, such as a digital camera or a video camera, is arranged to view a space in which a robot arm is expected to be moved from a distance of the milking robot, which is larger than that of the image capturing device arranged on the robot arm 4.

Each image capturing device 15 is suspended on a pivot connected to a motor 15a, which allows the image capturing device to change the desired view angle. Each image capturing devices 15 is furthermore provided with a zoom lens 15b, which is adjustable by means of a motor 15c for changing the focal length of the lens.

The robot 2 and the image capturing devices 15 are connected to a control unit 16, provided with a display unit 16a, such as a screen for displaying images from the image capturing devices 14, 15, for example, images of animals in the animal related spaces, and/or other information such as temperatures, pressures, flow rates, system status information etc., and a data input means 16b, such as a keyboard and/or a mouse and/or a microphone for inputting data and control instructions.

The control unit 16 is furthermore provided with a control program 17 which locally controls the movements of the robot arm 4 and the motors 15a, 15c, either automatically, i.e. in response to at least the image capturing device 14 arranged on the robot arm 4 or manually, i.e. in response to the data input means 16b. In case of automatic control, the control means 16 performs image analysis of captured images from the image capturing devices 14, 15 and determines appropriate action based on the analysed images.

Also the valve 9 and the pulsator 12 are connected to the control means 16 for allowing local automatic or manual control thereof.

An animal related space 18, in the form of an animal gateway is provided with a _gate 20 having an opening/closing means 22, such as a pneumatic cylinder, which is connected to the control unit 16, provided with a control program 23. A further image capturing device 15 is connected to the control unit 16, which automatically opens and closes the gate 20 and controls the motors 15a, 15c, in response to the image capturing device 15 connected to this control unit 16. Alternatively, the opening/closing means 22 and the motors 15a, 15c are manually controlled by manipulation of the data input means.

The animal related space 18 may be a stall for a whole herd of animals or an animal stall for one animal only. In particular, the robot 2 may perform animal related operations on an animal in an animal related space 18. It should be noted that the animal gateway with closed gate 20 is a kind of an animal stall. If needed, it is possible to add an extra gate 20, so that there is a gate in front of the animal and one gate behind the animal. In the case such an animal gateway with one or two gates 20 is provided with a robot 2, the animal gateway may be used for performing animal related operations, such as milking.

The control unit 16 is connected to a communications port 24, such as a modem, which in turn is connectible to a telecommunications network 26, comprising one or more fixed networks (possibly including radio links) or one or more cellular networks, or a combination thereof. As examples of possible telecommunication networks can be mentioned the Internet, the public telephone networks and private Intranets.

A remote control device 28 is provided at another point of the telecommunications network 26, and is connectible thereto by means of a communications port 30, such as a modem. The remote control device 28 is provided with a display unit 32, such as a screen, for displaying images from the image capturing devices 14, 15, for example, images of animals in the animal related spaces, and/or other information such as temperatures, pressures, flow rates, system status information etc., and a data input means 34, such as a keyboard and/or a mouse and/or a microphone for inputting data and control instructions.

The remote control device 28 furthermore comprises a data processing unit, a volatile memory (RAM), and a non-volatile memory (ROM), which contains a program for reception of said captured image data. The program is adapted to be executed by said data processing unit, in response to received image data from the image capturing devices 14, 15.

However, the data processing unit may instead be part of the telecommunications network.

According to this first embodiment, it is thus possible to locally control the robot arm 4, the cameras 14, 15 and the gate 20, either automatically (by means of the program 17) or manually (by means of the data input means 16b).

Figure 2:
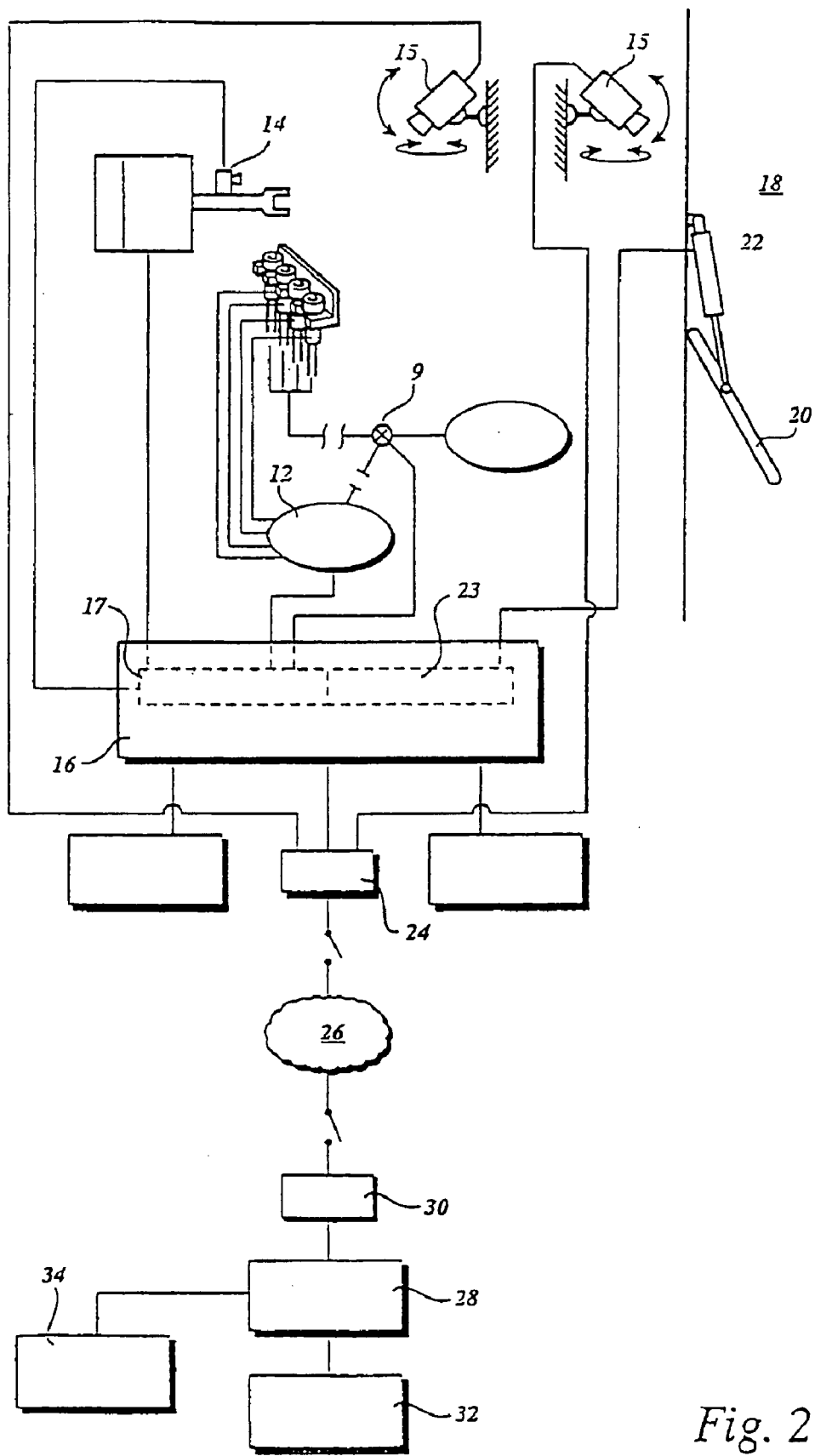
FIG. 2 illustrates schematically a second embodiment of the invention.

In the embodiment of FIG. 2, the image capturing devices 15 are connected to the communications port 24 without previous connection to the control unit 16.

In this case, the image capturing devices 15 will be controlled by the remote control device 28, either automatically by a control program, or manually, by manipulation of the data input means 34.

Figure 3:
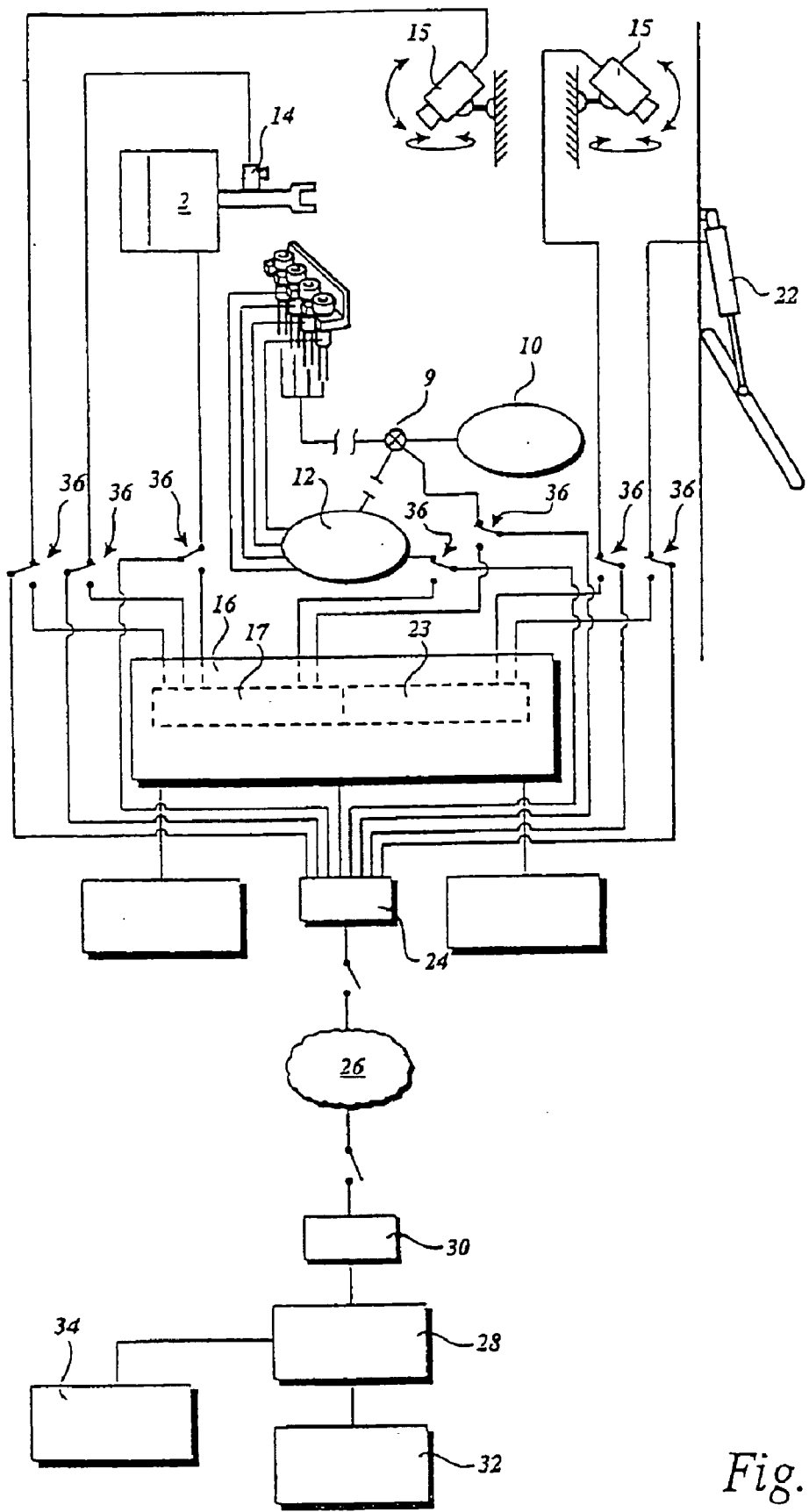
FIG. 3 illustrates schematically a third embodiment of the invention.

In the embodiment according to FIG. 3, not only the image capturing devices 15 are arranged to by-pass the control unit 16, but also the image capturing device 14, the robot 2, the gate closing/opening cylinder 22, the valve 9 and the pulsator 12. A switch 36 is provided for each item that should be allowed to by-pass the control unit 16. Of course, the switches 36 may be an integrated part of the control unit 16, either as hardware or software.

The switches 36 individually and selectively are controllable by manipulation of the data input means 16b or 34. If the remote control device 28 is intended to control e.g. the robot arm 4 then the control unit 16 can be by-passed by switching the relevant switch 36 to a by-passing position. In this case, the robot arm 4 will either be automatically controlled by a program in the remote control device 28, or by manipulation of the data input means 34.

In the embodiments of FIGS. 1 to 3, there is a common control unit 16 for the robot 2 and the gate 20. Of course, they may be separate and are then both connected to the communications port 24.

Figure 4:
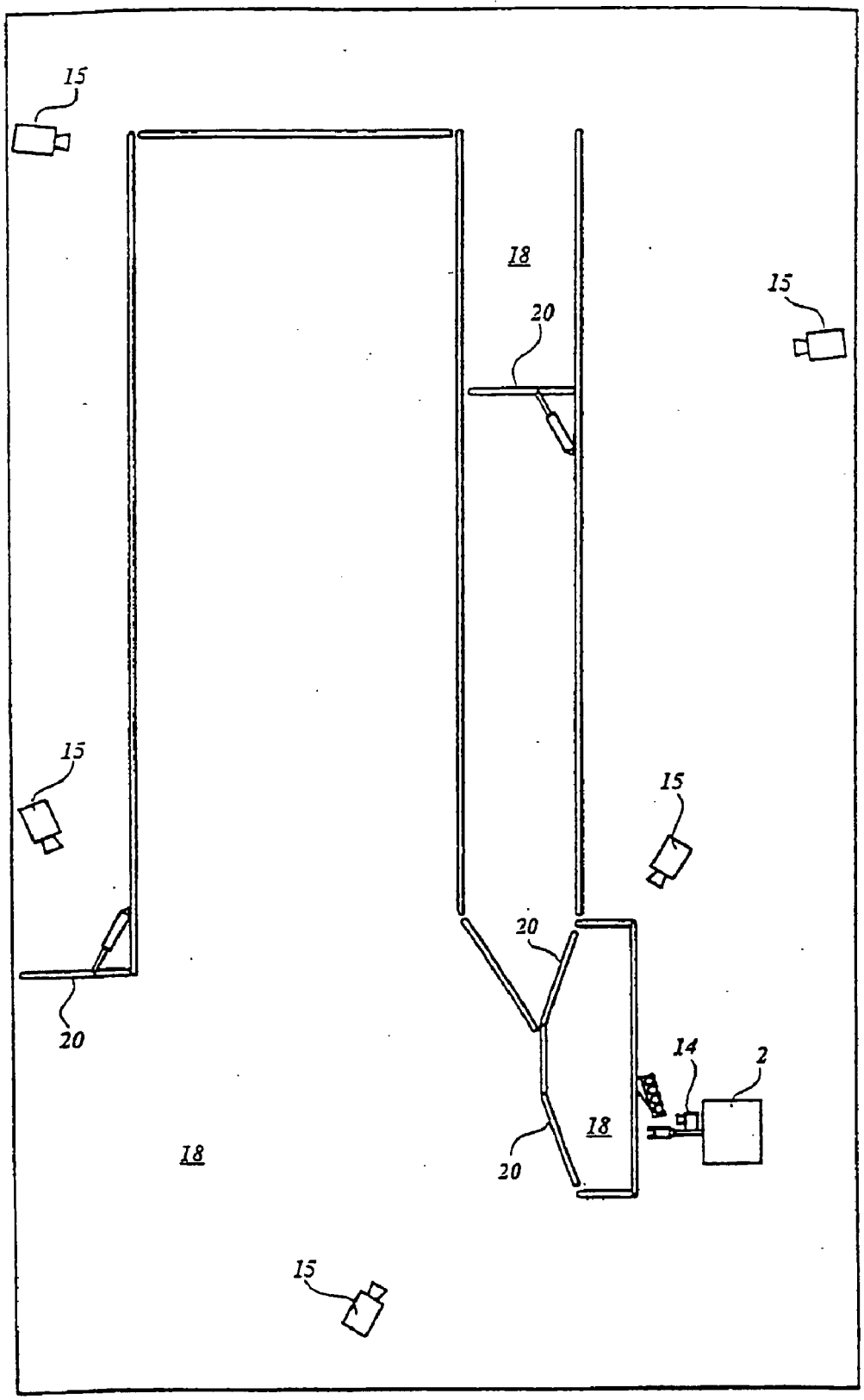
FIG. 4 illustrates an animal related space.

FIG. 4 illustrates an animal related space 18, such as an animal shed, provided with a robot 2 with image capturing device 14, a plurality of gates 20 and a plurality of image capturing devices 14 and 15 and a robot 2. The animal related space is divided into smaller animal related spaces 18, such as a robot stall, a lane or a residing area.

The control is performed according to anyone of the above described embodiments.

If the image from any of the image capturing devices 14, 15i establishes that an abnormal situation has arisen, e.g. that one or several animals are in a state of panic, then the gates 20 can be controlled to be kept open. This can be performed automatically by the control programs in the control unit 16 or remote control device 28 or by a supervisor. If the animal in panic is in the robot stall, the milking operation can be interrupted if the milking operation has already started, e.g. by closing the valve 9, stopping the pulsator 12 and detaching the teatcups 8. At the same time a supervisor (if present) may try to calm the animal by speaking encouraging words into the microphone at the control unit 16 or remote control device 28. These words can be broadcast from a loudspeaker in the animal related space. In the event of an automatic system these words may be pre-recorded and played back under the control of the control program. Afterwards, the gates 20 of the robot stall may opened.

Operation

A stall provided with the apparatus according to the invention works autonomously, i.e. the control unit 16 operates automatically or manually without interference of the remote control means 28.

Alternatively, the apparatus is operated by a program run by the remote control means 28, either automatically or manually.

Alternatively, the apparatus is run by the control unit 16, but if needed, the control unit 16 is by-passed and it is then possible to operate the apparatus by the remote control means 28, either automatically or manually.

Accordingly, the captured image data is transmitted to the remote control device 28 either as image data or via the control unit 16 as analysed image data.

In order to supervise the stall when the farmer of the stall is on holiday, is asleep or is out on the fields, a service firm—which may be situated anywhere, for example, close to where the stall is placed, or at a location very far away therefrom—or another farmer may be contracted to keep an eye on the stall. This is done via the remote control device 28. The firm service may take care of several stalls and supervise them simultaneously.

If an abnormal situation occurs, such as an emergency situation, the control unit 16 generates a warning signal, which is transmitted to the remote control device 28. The supervisor in charge is accordingly directly warned and is able to view one or several images that are transferred.

Examples of abnormal situations are that an animal lies where not allowed, a tool box is left unattended, the robot arm is not able to attach the teatcups onto the teats, or the animal is run in a state of panic or distress.

If the remotely situated supervisor can immediately establish the occurred problem, he or she can use the data input means 34 to e.g. move the robot arm, in the case that it has dropped a teatcup on the floor.

If the supervisor cannot immediately establish the occurred problem, it is possible to pivot the image capturing devices 15 to view the whole stall, to switch between cameras arranged at strategic places, and when having established where the actual problem is, to control the motor 15c to change the focal length of the zoom lens, in order to get a closer view of a desired area or space or animal.

It should be noted that it is also possible to transfer to said remote control device, collected animal related data—such as average milk yield, latest milk yield, feed consumption, oestrous etc.—to be used as basis for the generation of a control instruction.

It should be understood that details of the first embodiment are applicable to the second and third embodiments and vice versa.

Furthermore it should be understood that the method and apparatus in accordance with the invention allows a remotely situated supervisor in real-time to obverse and interactive with animals in animal related spaces. The supervisor can see images of an animal and also receive telemetry data which enables him to analyse the animal's situation. After this analysis he can decide on appropriate action(s) and then send commands to a controllable device in order to perform the necessary action(s). By following the results of these commanded actions on his display unit the supervisor can issues new instructions as required thereby enabling real-time interaction with animals in the animals related spaces.

It should also be understood that wherever the apparatus makes reference to an animal all kinds of lactating animals are included, such as cows, sheep, goats, buffaloes and horses.

What is claimed is:

1. An apparatus for monitoring at least a part of an animal related space, comprising a controllable device (2, 22) and at least one image capturing device (14, 15) for generating and supplying captured image data regarding said animal related space, characterised in that:

said image capturing device (14, 15) is associated with a communications port (24) connectible to a telecommunications network (26);

a remote control device (28) is associated with a further communications port (30) connectible to said telecommunications network (26);

said image capturing device (14, 15) is connectible to said remote control device (28) via said telecommunications network (26);

said remote control device (28) is adapted to receive said captured image data;

said remote control device (28) is associated with a display unit (32) for allowing viewing of said captured image data;

a data input means (34) is associated with said remote control device (28), for entering a control instruction;

said remote control device (28) is adapted to output said control instruction via said further communications port (30); and, said controllable device (2, 22) is arranged to be interactively manipulated by said remote control device (28) in response to said control instruction, wherein, a control means (16) is provided between said controllable device (2, 22) and said communications port (24), said controllable device (2, 22) being automatically controlled by said control means (16), said control means (16) is provided with a display unit for allowing viewing of said captured image data, a local data input means is associated with said control means (16), for locally entering a control instruction, and a switch means (36) is provided for allowing by-pass of said control means (16) to allow a user to choose between i) local manual or automatic control of said controllable device and ii) remote manual or automatic control of said controllable device.

2. An apparatus for monitoring at least a part of an animal related space, comprising a controllable device (2, 22), and at least one image capturing device (14, 15) for generating and supplying captured image data regarding said animal related space, characterised in that:

said image capturing device (14, 15) is associated with a communications port (24) connectible to a telecommunications network (26), for association of said image capturing device (14, 15) with a remote control device (28) connectible to said telecommunications network and adapted to receive said captured image data, wherein, a control means (16) is provided between said controllable device (2, 22) and said communications port (24), said controllable device (2, 22) being automatically controlled by said control means (16), said control means (16) is provided with a display unit for allowing viewing of said captured image data, a local data input means is associated with said control means (16), for locally entering a control instruction of said image capturing device and said controllable device, and a switch means (36) is provided for allowing by-pass of said control means (16) to allow a user to choose between i) local manual or automatic control and ii) remote manual or automatic control of said image capturing device and said controllable device.

3. An apparatus according to claim 1, wherein said controllable device (2, 22) is associated with said communications port (24).

4. An apparatus according to claim 1, wherein said control means (16) is provided between said image capturing device (14, 15) and said communications port (24), said image capturing device being automatically controllable by said control means.

5. An apparatus according to claim 1, wherein said switch means (36) allows a user to choose between i) local manual or automatic control and ii) remote manual or automatic control of said image capturing device and said controllable device.

6. An apparatus according to claim 1, wherein said control means (16), by operation of said switch means (36), is switchable between: i) a remote control mode for receiving said control instruction from said remote control device, said controllable device being adapted to perform an operation in response to said remote control device via said control means, and ii) a local control mode from commands input from the local data input means.

7. An apparatus according to claim 1, wherein either of said remote control device (28) and said control means (16) is adapted to generate an alerting signal if an abnormal situation is established.

8. An apparatus according to claim 1, wherein said animal related space (18) comprises an animal space provided with said controllable device (2, 22).

9. An apparatus according to claim 1, wherein said animal related space (18) comprises an animal gateway provided with said controllable device (2, 22).

10. An apparatus according to claim 1, wherein said controllable device (2, 22) comprises an openable and closeable gate, a position of said gate is established by said image capturing device (15).

11. An apparatus according to claim 1, wherein said controllable device comprises a movable robot arm (4) provided with a gripper (6).

12. An apparatus according to claim 11, wherein said image capturing device (14) is arranged on said robot arm (4).

13. An apparatus according to claim 12, wherein a position of a teat of an animal is established by said image capturing device (14), for allowing attachment of a teatcup on said teat.

14. An apparatus according to claim 1, wherein it further comprises a milking equipment provided with at least one teatcup (8) associated with a pulsator (12), adapted to be controlled by said remote control device (28).

15. An apparatus according to claim 13, wherein said teatcup is associated with a vacuum source (10) via a valve (9), said valve being adapted to be operated in response to said remote control device (28).

16. An apparatus according to claim 1, wherein said controllable device comprises a driving means (15a) with a turnable axle connectible to said image capturing device (15).

17. An apparatus according to claim 1, wherein said controllable device comprises a driving means (15c) for a zoom lens (15b) arranged on said image capturing device (15).

18. An apparatus according to claim 1, wherein analysis of an image captured by said image capture device is performed by said control means (16, 17, 23).

19. An apparatus according to claim 1, wherein analysis of an image captured by said image capture device is performed by said remote control device (28).

20. An apparatus according to claim 2, wherein said remote control device (28) is provided with a display unit (32) for allowing viewing of said captured image data, and wherein a data input means (34) is associated with said remote control device (28), for entering a control instruction.

21. An apparatus according to claim 1, wherein said remote control device (28) comprises a microphone and/or loudspeaker.

22. An apparatus according to claim 1, wherein said animal related space comprises a microphone and/or loudspeaker.

23. An apparatus according to claim 1, wherein said display unit (32) can display an image of an animal wherein said image is captured by an image capturing device (14, 15).

24. A remote control device (28) adapted to receive captured image data comprising a communications port (30), via which said control instruction is to be output, for interactively manipulating a controllable device (2, 22) of the apparatus according to claim 1.

25. A method of monitoring at least a part of an animal related space, comprising a controllable device (2, 22) and at least one image capturing device (14, 15) for generating and supplying captured image data regarding said animal related space, characterised by:
  connecting said image capturing device (14, 15) to a communications port (24) for allowing connection to a telecommunications network (26);
  connecting a remote control device (28) to a further communications port (30) for allowing connection to said telecommunications network (26);
  adapting said remote control device (28) to receive said captured image data;
  providing said remote control device (28) with a display unit (32);
  entering a control instruction in a data input means (34) associated with said remote control device (28);
  transmitting said control instruction via said further communications port (30); and,
  interactively manipulating said controllable device (2, 22) by said remote control device (28) in response to said control instruction;
  including automatically controlling said controllable device (2, 22) by means of a control means (16) provided between said controllable device (2, 22) and said communications port (24) and;
  including by-passing said control means (16) by means of a switch means (36).

26. A method according to claim 25, including associating said controllable device (2, 22) with said communications port (24).

27. A method according to claim 25, wherein control of said controllable device is selectable between any of remote automatic control, remote manual control, local automatic control, and local manual control.

28. A method according to claim 25, including automatically controlling said image capturing device (14, 15) by means of said control means (16), provided between said image capturing device and said communications port (24).

29. A method according to claim 25, wherein, by-passing said control means (16) by means of a switch means (36) allows a user to choose between i) local manual or automatic control and ii) remote manual or automatic control of said image capturing device and said controllable device.

30. A method according to claim 25, including:
  switching said control means (16) to a remote control mode;
  allowing said control means (16) to receive said control instruction from said remote control device (28);
  performing an operation in response to said remote control device (28) via said control means (16).

31. A method according to claim 25, including generating an alerting signal if either of said control means (16) and said remote control device (28) establishes an abnormal situation.

32. A method according to claim 25, including performing image analysis by means of said control means (16) of an image captured by said image capture device (14, 15).

33. A method according to claim 25, including viewing said captured image data in a display unit (16a) associated with said control means (16), and locally entering a control instruction in a local data input means (16b) associated with said control means (16).

34. A method according to claim 25, including performing image analysis by means of said remote control device (28) of an image captured by said image capture device (14, 15).

35. A method according to claim 25, including viewing said captured image data in a display unit (32) associated with said remote control device (28), and entering a control instruction in a data input means (32) associated with said remote control device (28).

36. A method according to claim 25 including the steps of:
  directing at least one image capturing device (14, 15) towards an animal in said animal related space and capturing an image of said animal.

37. A method according to claim 36 including the steps of:
  analysing said image by said control unit (16) or remote control means (28);
  automatically determining appropriate control action by said control unit (16) or remote control means (28); and
  performing said control action under the control of a control program in said control unit (16) or said remote control means (28).

38. A method according to claim 36 including the step of:
  displaying said image of said animal on at least one said display unit (32).

* * * * *